United States Patent
Radway et al.

(10) Patent No.: US 7,276,217 B2
(45) Date of Patent: Oct. 2, 2007

(54) REDUCTION OF COAL-FIRED COMBUSTION EMISSIONS

(75) Inventors: Jerrold E. Radway, El Cajon, CA (US); Thomas M. Miller, El Cajon, CA (US)

(73) Assignee: Premier Chemicals, LLC, Conshohocken, PA (US)

( * ) Notice: Subject to any disclaimer, the term of this patent is extended or adjusted under 35 U.S.C. 154(b) by 26 days.

(21) Appl. No.: 11/204,765

(22) Filed: Aug. 16, 2005

(65) Prior Publication Data

US 2006/0034743 A1 Feb. 16, 2006

Related U.S. Application Data

(60) Provisional application No. 60/601,766, filed on Aug. 16, 2004.

(51) Int. Cl.
B01D 53/50 (2006.01)
B01D 53/64 (2006.01)
F23B 90/00 (2006.01)
F23K 1/00 (2006.01)

(52) U.S. Cl. ............ 423/210; 423/244.01; 423/244.08; 431/2; 110/218; 110/342; 110/343

(58) Field of Classification Search ............. 423/244.1, 423/244.01, 244.08, 210; 431/2; 110/218, 110/342, 343
See application file for complete search history.

(56) References Cited

U.S. PATENT DOCUMENTS

| | | | |
|---|---|---|---|
| 1,545,620 A | 7/1925 | Trent | 44/575 |
| 2,718,453 A | 9/1955 | Beckman | 423/244.08 |
| 3,249,075 A | 5/1966 | Nelson et al. | 110/343 |
| 3,540,387 A | 11/1970 | McLaren et al. | 110/345 |
| 3,625,164 A | 12/1971 | Spector | 110/342 |
| 3,746,498 A | 7/1973 | Stengel | 431/4 |
| 3,837,820 A | 9/1974 | Kukin | 431/2 |
| 4,185,080 A | 1/1980 | Rechmeier | 423/244.05 |
| 4,235,585 A | 11/1980 | Anderson | 431/3 |
| 4,245,573 A | 1/1981 | Dixit et al. | 110/343 |
| 4,253,408 A | 3/1981 | Kramer | 110/346 |
| 4,309,393 A | 1/1982 | Nguyen | 423/244.07 |
| 4,381,718 A | 5/1983 | Carver et al. | 110/347 |
| 4,427,362 A | 1/1984 | Dykema | 431/4 |
| 4,542,704 A | 9/1985 | Brown et al. | 110/347 |
| 4,555,996 A | 12/1985 | Torbov et al. | 110/345 |
| 4,655,148 A | 4/1987 | Winship | 110/347 |
| 4,771,712 A * | 9/1988 | Engstrom et al. | 110/347 |
| 4,796,548 A | 1/1989 | Merrell et al. | 110/343 |
| 4,807,542 A * | 2/1989 | Dykema | 110/343 |
| 4,823,710 A | 4/1989 | Garrido et al. | 110/234 |
| 4,867,955 A | 9/1989 | Johnson | 423/244.07 |
| 4,960,577 A | 10/1990 | Torbov et al. | 423/244.05 |
| 5,006,323 A | 4/1991 | Johnson | 423/244.07 |
| 5,034,205 A | 7/1991 | Laine | 423/244.08 |
| 5,368,617 A * | 11/1994 | Kindig | 44/622 |
| 6,001,152 A | 12/1999 | Sinha | 95/58 |
| 6,289,827 B1 | 9/2001 | Wajer et al. | 110/345 |
| 6,729,248 B2 * | 5/2004 | Johnson et al. | 110/342 |

FOREIGN PATENT DOCUMENTS

WO    WO 2007/031552 A1    3/2007

OTHER PUBLICATIONS

Alexander, P.A. et al., Acid Deposition in Oil-fired Boilers: Comparative Trials of Additives and Testing Techniques, *Journal of the Institute of Fuel*, pp. 53-72, Feb. 1961.

Schmidtchen, Paul A. et al., High Activity Magnesia Use for SCR Related $SO_3$ Problems, Summary, 2 pages, date unknown.

Radway, J.E., Effectiveness of Fireside Additives in Coal-Fired Boilers, *Power Engineering*, pp. 72-75, Apr. 1978.

Radway, J.E. et al., Reduction of Coal Ash Deposits with Magnesia Treatment, 19 pages, Copyright 1977.

Radway, J.E., How More Ash Makes Less, Environmental Science & Technology, pp. 388-391, Apr. 1978.

Radway, Jerrrold E. et al., Practical Considerations in Controlling Plume Opacity on an Oil-fired Boiler, EnerChem Incorporated Technical Paper, 6 pages, Jun. 1980.

Hüttenhofer, K. et al., Effects on Catalytic Activity and $SO_2/SO_3$ Conversion of DeNO$_x$ Catalytic converters Downstream of Oil-Fired Power Plants: Causes and Remedial Measures, Paper presented at EPRI/EPA Joint Symposium on Stationary Combustion NO$_x$ Control, 26 pages, May 1993.

Dainoff, A.S. et al., Mechanisms and Techniques for the MgO Treatment of Coal-Fired Utility Boilers, Paper presented at Engineering Foundation Conference on "Fouling and Slagging from Impurities in Combustion Gases," 21 pages, Jul. 1984.

* cited by examiner

*Primary Examiner*—Timothy C. Vanoy
(74) *Attorney, Agent, or Firm*—Alfred J. Mangels

(57) ABSTRACT

A process for mitigation of fouling deposits within a combustion zone, capturing of toxic metal emissions, and reduction of visible sulfur emissions attributable to sulfuric acid mist during coal combustion. $SO_3$ formed during coal combustion is reduced by the addition to the coal of raw, unprocessed magnesium-containing minerals such as magnesite ore or brucite ore. The minerals are pulverized to a fine particle size and combined with pulverized coal to provide a mixture of the particles. The mixture is combusted and the ore particles calcine and decrepitate to very fine magnesium oxide particles that have a significant particle surface area. The magnesium oxide particles react with the $SO_3$ produced during combustion of the coal and also capture toxic metals to reduce the quantity of undesirable stack discharge components.

7 Claims, No Drawings

REDUCTION OF COAL-FIRED COMBUSTION EMISSIONS

CROSS-REFERENCE TO RELATED APPLICATION

This application claims the benefit of U.S. Provisional Application Ser. No. 60/601,766, filed on Aug. 16, 2004.

BACKGROUND OF THE INVENTION

1. Field of the Invention

The present invention relates to processes for improved operation of coal-fired electrical utility boilers and other solid-fuel-fired, high temperature combustion reactors. More particularly, the present invention relates to processes for reducing fouling of solid-fuel-fired boiler internal components, reducing corrosion within such boilers, and reducing undesirable and noxious stack emissions.

2. Description of the Related Art

In coal-fired power generating plants, as well as in other industrial processes involving combustion of coal, the products of the combustion process include compounds that have an adverse influence on boiler operation, or are environmentally undesirable and the discharge of which into the environment is subject to environmental regulations. Such compounds include sulfur oxides ($SO_x$), nitrogen oxides ($NO_x$), and such heavy metals as mercury, arsenic, lead, and cadmium. In order to meet environmental limitations affecting the discharge of the most prevalent sulfur oxide, $SO_2$, into the atmosphere, combustion products from such plants and processes are commonly passed through flue gas desulfurization (FGD) systems. The sulfur oxides contained in such combustion products are thereby converted into less-environmentally-harmful compounds that are either disposed of in landfills, or, when suitably modified or treated, are sold as marketable chemicals.

The treatment of flue gases to capture $SO_2$ is often effected in lime- or limestone-based wet scrubbers, in which lime or limestone slurries are sprayed into the flue gases before they are discharged into the atmosphere. The sulfur oxides are thereby chemically converted into insoluble calcium compounds in the form of calcium sulfites or sulfates. The less environmentally harmful calcium compounds are separated from the scrubber blowdown liquor and either are disposed of in landfills or are converted into marketable gypsum.

Although useful for converting some sulfur oxides, widely-used lime/limestone scrubbers are not very effective in capturing the 1% to 1.5% of the sulfur in the fuel that is transformed during the combustion process into gaseous $SO_3$, which can escape from the scrubber. The $SO_3$ poses operating problems within the boiler itself, in that it leads to corrosion and fouling of low temperature heat exchange surfaces. Additionally, it poses environmental problems in that unless captured or transformed, the $SO_3$ results in a persistent visible plume and the discharge of corrosive and potentially hazardous sulfuric acid fumes. Further complicating the matter, selective catalytic reactors (SCR's), which are available and are installed in such plants to comply with nitrogen oxide emission regulations, essentially cause a doubling of the amount of $SO_3$ that is generated, and consequently the already serious operational and environmental problems caused by the presence of $SO_3$ are magnified.

The $SO_3$ emission problem has been addressed chemically using a variety of alkaline chemicals that are injected into the system at many different points in the flue gas flow path. Lime or limestone injected into the high temperature region of the boiler can be effective in capturing the $SO_3$, but it tends to magnify boiler deposit problems and to increase the quantity of particulates that escape from the precipitators. The adverse impact on the precipitators is also encountered when lime or lime hydrate is injected as powders into the lower temperature region downstream of the SCR's. The precipitator problem can be circumvented by injecting the lime downstream of the precipitator, but an efficient backup dust collector is needed, and most FGD scrubbers are not efficient collectors of fine particulates.

Sodium compounds, such as the bisulfite, carbonate, bicarbonate and carbonate/bicarbonates (Trona) compounds, have also been injected into the cooler regions of the system and are effective in $SO_3$ capture. However, they pose material handling and some deposit problems, and they tend to have poor utilization efficiencies unless they are ground to very fine particle sizes. Relatively coarse particles are prone to formation of an outer sulfate shell, thereby inhibiting utilization of the unreacted chemical inside the shell. Additionally, grinding of such materials is expensive, and it creates storage and handling problems because of the fineness of the particles.

Commercially-available, but relatively expensive, oil-based magnesium additives can be extremely effective in $SO_3$ capture. In that regard, one of the most effective chemical techniques for controlling both ash-related fouling in the boiler, and also the corrosion and emission problems associated with $SO_3$ generated in solid-fueled boilers, is the injection into the upper region of the boiler of oil slurries of MgO or $Mg(OH)_2$. That technology was originally developed for use with oil-fired boilers in which the magnesium-based oil suspension was usually metered into the fuel. It was later applied to coal-fired boilers. The most widely accepted mode of application of such additives today is by injection of slurries of MgO or $Mg(OH)_2$ into the boiler above the burners and just below the region at which a transition from radiant heat transfer to convective heat transfer occurs.

In addition to the oil-based slurries, $Mg(OH)_2$ powders and water-based slurries have also been utilized as fireside additives in boilers, but because of their generally coarser particle size they are less efficient in capturing the $SO_3$. Water slurries of MgO have also been injected through specially modified soot blowers on oil and Kraft-liquor-fired boilers, in which they moderated high temperature deposit problems but had only a nominal impact on $SO_3$-related problems because of an inability to apply the chemicals continuously.

Regulations aimed at controlling mercury emissions of coal-fired boilers have been promulgated by regulatory authorities, and regulations applicable to other toxic metals are anticipated eventually. A considerable amount of research aimed at finding practical techniques for capturing such toxic metals has shown that high surface area solids can capture a significant portion of mercury by adsorption, if the mercury is in an oxidized form rather than an elemental form. Oxidants, either added to or naturally present in the fuel, such as chlorides, can facilitate the oxidation. Although high surface area lime can be effective in mercury capture, it results in operational problems in the form of ash deposits and increased stack emissions. The most widely accepted way to achieve capture has been injection of expensive activated carbons.

It is therefore an object of the present invention to provide processes by which boiler operational and emissions problems can be reduced more economically than is attainable by presently-utilized methods.

SUMMARY OF THE INVENTION

Briefly stated, in accordance with one aspect of the present invention, $SO_3$ and undesirable metals can both be efficiently and economically captured in coal-fired combustion processes by introducing raw magnesite ore in the form of particulate magnesite into the high temperature region of a coal-fired boiler. The introduction can be effected by the co-milling of a mixture of magnesite ore with the coal to a predetermined particle size range. The particulate mixture of magnesite particles and coal particles is introduced into the high temperature combustion zone of the boiler, whereupon the sudden exposure of the magnesite particles to the high temperature causes the magnesite particles to rapidly flash calcine and explosively fracture. The calcination results in high-surface-area, finely-sized MgO that reacts with $SO_3$ formed as part of the combustion products, and that also serves to adsorb the toxic metals, thereby capturing the toxic metals and reducing the quantity of environmentally undesirable stack discharge components.

DESCRIPTION OF THE PREFERRED EMBODIMENTS

The coal combustion process in boilers, such as those included in electric power generation plants, results in the fouling of boiler fireside surfaces and also in the emission of undesirable compounds as combustion products. In the past, processed magnesium compounds were often utilized to mitigate those problems. Instead of expensive, processed magnesium compounds for the control of boiler fireside fouling and for reducing emissions of undesirable compounds, the present invention teaches the direct application of less expensive materials. Specifically, the use of magnesium-carbonate-containing ores is taught. Included as such ores are raw, mineral magnesite ores. As used in the present application, the term "raw" includes unprocessed and untreated mineral magnesite ore as it is extracted from the ground.

Coal for combustion in power plants is commonly delivered in two sizes, –3" or –¾". The coarser size usually undergoes a crushing step before it is fed to a coal mill while the minus ¾" is normally fed directly to the mill to undergo a milling step for particle size reduction to a desired size. The milling can be accomplished in any of the types of mills that are presently utilized to grind coal, such as ball mills, ring roller mills, and the like.

Magnesite ore is provided in rock form of about –¾" particle size, and it can be added directly to unground coal before the coal is ground for subsequent introduction into the combustion zone of the boiler. Moreover, if desired, the magnesite ore particles can be separately milled, either wet milled (with oil or water) or dry milled, and thereafter combined with previously-milled coal particles, or the magnesite ore particles can be injected directly into the flame zone.

The size range of the raw magnesite ore particles can be from about 6" to about 10 microns before the ore particles are milled along with the coal. Advantageously, the magnesite ore particle size is similar to that of the coal in order to minimize segregation that can occur in the course of conveying the magnesite ore particles and coal particles from their respective piles to the mill. The disclosed sizes are nominal and refer to the largest size one should encounter. Normally, there is considerable material that is quite a bit finer.

The coal utilized in coal-fired power plants typically has a Hardgrove grindability in the range of from about 40 to about 60, with the higher value corresponding to coal that is easier to grind. Magnesite ores can have a grindability value that lies outside that range. In the present invention, the magnesite ores preferably have a Hardgrove grindability that lies in the range of from about 90 to about 95. Ores in that grindability range are therefore easier to grind than the coal.

Both the coal and the magnesite ore can be milled together to provide a mixture of coal and substantially uniformly-distributed magnesite particles, wherein each constituent of the mixture has a final particle size of the order of about –200 mesh. In that regard, testing performed on the magnesite grindability, combined with subsequent field testing, revealed the surprising and unexpected result that commingling raw magnesite stone with the coal was well tolerated by the existing coal handling and grinding processes.

As only one example of how magnesite ores can be combined with coal to fuel a coal-fired boiler, the magnesite ores can be fed on a conveyor belt that drops the material onto a coal conveyor belt. The feed rates of the respective belts are chosen to conform with the desired ratio of magnesite ore to coal. The coal and magnesite ores are then transported to the mill for particle size reduction, so that the combined materials are homogenized within the mill. The output from the mill can be deposited onto a conveyor belt that then discharges the combined materials into a fuel bunker that feeds one or more burners.

The quantity of the raw, unprocessed, magnesium-carbonate-containing ore in the coal-ore mixture is an amount that results in a ratio of elemental magnesium to $SO_3$ in the flue gas of at least about 1:1. That ratio can range from about 1:1 to about 10:1.

The coal-particle magnesite-particle mixture is introduced into the high temperature region of the boiler, whereupon the magnesite particles rapidly flash calcine to yield MgO. The flash calcination into MgO particles is a function of the temperature and the exposure time, and is believed to occur within about 1 to 2 seconds of the introduction of the particulate coal-magnesite mixture into the high temperature region. That region of the boiler or furnace is usually at a temperature of the order of about 3000° F., which is sufficiently high to result in the flash calcination of the magnesite particles. Preferably, the boiler or furnace temperature is at least about 2800° F.

During the combustion process, and by virtue of their exposure to the high temperatures provided by the coal combustion, the magnesite particles, which are primarily magnesium carbonate, flash calcine, decrepitate, and rapidly convert into finely-sized, high-surface-area, and highly reactive magnesium oxide particles. The particles have a loss on ignition (LOI) of from about 12 wt % to about 0.5 wt %, and have a specific surface area of from about 200 m²/g to about 5 m²/g. The magnesium oxide particles react with $SO_3$ and $H_2SO_4$ that are produced as coal combustion by-products to yield $MgSO_4$. The MgO particles thereby reduce the discharge from the stack of acidic combustion product gases. In addition to reacting with $SO_3$ and $H_2SO_4$, the high surface area of the calcined MgO particles is believed to also be capable of capturing mercury and other toxic metals, such as arsenic, lead, cadmium, and selenium. And although calcination processes are known, the flash calcination of the magnesite particles led to the surprisingly high particle surface areas that contribute to the effectiveness of the present process in providing improved $SO_3$ capture.

The calcined MgO particles also serve to reduce the buildup of ash deposits on components within the combustion zone. The ash deposit reduction results from the raising of the ash fusion temperature as a consequence of the formation of MgO, and the direct reaction of the MgO with ash components.

The magnesite-$SO_3$ reaction occurs downstream of the combustion zone. Accordingly, a relatively uniform distribution of the MgO particles is therefore desirable. In that regard, unless it is reacted with the MgO, the $SO_3$ is a vapor until the gas stream cools to about 900° F., at which point it combines with water vapor to form an $H_2SO_4$ aerosol, which can still be adsorbed by and reacted with the MgO particles.

Depending upon the mineral form of the magnesite ore that is utilized, calcium present in the form of carbonate also serves to help scavenge $SO_3$. Other impurities in the magnesite ore are largely diluents. The magnesite ore that can be utilized for carrying out the present invention is preferably of a type that has from about 70% to about 98% MgO on an ignited basis, with oxides of Ca, Si, Fe, and Al typically making up the difference. The use of magnesite ores having significant quantities of heavy metals should be minimized in order to avoid contributing to the heavy metal emissions that are alleviated by the present process. Pyrites are undesirable because they catalyze the acid reaction and contribute to the sulfur present within the boiler. Pyrite is also are more difficult to grind. Alkalis as magnesite ore constituents are also undesirable because they contribute to ash fouling that affects the efficiency of heat transfer to the boiler tubes. Not all of the magnesium present in the magnesite is in the form of $MgCO_3$. It is commonly reported as MgO, but may also be tied up with silica or with calcium as dolomite and is therefore generally unavailable. That fraction is not effective in capturing $SO_3$.

The proportion of magnesite ore in the coal-magnesite ore mixture on a weight basis can range from about 0.25% for a low sulfur coal to about 2.5% for a high sulfur coal. The most beneficial magnesite-coal ratio is a function of several factors. Among those factors are the sulfur content of the coal, the fraction of the coal-based sulfur that is converted into $SO_3$ within the boiler, the proportion of that sulfur fraction that power plant management feels is environmentally acceptable for discharge into the atmosphere, and the stoichiometric fuel-magnesite ratio needed to meet that sulfur fraction objective in the particular boiler. The fuel-magnesite ratio can be from about 0.5 to up to about 8 or 10 times the stoichiometric amount of $SO_3$ generated.

Another important advantage of magnesite ore over processed MgO as the coal additive is that the ore can be stored outdoors, on the ground, and without cover or protection from the elements. It therefore does not require high capital investment in the form of expensive bins and dust collectors. Moreover, magnesite ore has very low solubility and does not retain moisture. That property avoids leaching into the surface water.

In addition to its effect on $SO_3$ discharges, it is believed that mercury is also captured by the calcined MgO particles, by physical adsorption rather than by any chemical reaction with the MgO particles. The physical adsorption is believed to be influenced by the surface area of the sorbent. In that regard, and as noted above, the calcined MgO particles have a high surface area.

EXAMPLE 1

A laboratory experiment was conducted to evaluate the effect on the production of MgO particles of the introduction of finely divided magnesite into a high temperature zone. Raw magnesite ore particles were ground to provide finely divided magnesite particles of which about 90% were of a particle size that was capable of passing through a −200 mesh screen. The finely divided magnesite F particles were introduced into the air intake of a propane-gas-fired burner in the form of a refractory-lined enclosure having a top vent. A collector hood was placed over the top vent and was connected to a two-stage dust collector in order to recover particulates that resulted from the exposure of the magnesite particles to the heat generated within the burner.

The flame temperature at the hottest part of the flame was measured to be about 2150° F., while the temperature at the dust collector inlet was about 180° F. The approximate residence time of the magnesite particles was from about 1 to about 2 seconds.

A powder material was recovered in the dust collector, and upon x-ray diffraction analysis was found to be composed of MgO and $MgCO_3$, which suggests that the magnesite particles rapidly flash calcined into MgO and $MgCO_3$. The powder was determined to have an LOI at 1000° C. of about 7.9 wt % and a specific surface area of about 22.6 $m^2/g$, whereas the uncalcined magnesite particles before introduction into the combustion zone had a specific surface area of about 2.2 $m^2/g$. The LOI value of the calcined particles indicates that roughly 16% residual $MgCO_3$ is left behind in the MgO, and that even higher surface area would be achieved at a higher temperature. The surface area of calcined magnesite typically peaks with an LOI in the range of 3 wt % to 5 wt %, and with the highest values at higher temperatures for short times.

EXAMPLE 2

A 550 MW power plant boiler that includes a downstream SCR and a wet lime scrubber burns about 250 tons of coal per hour. The coal is a Midwestern bituminous coal and has an average sulfur content of about 2.7%, which results in about 27 to about 30 ppm $SO_3$ in the stack when the SCR is not in operation. When the SCR is operating, the $SO_3$ level in the stack increases to about 50 ppm or more.

Crushed magnesite ore having a size of −¾ inch was added to the coal bunker feed belt at a rate to provide about 1.25% magnesite in the pulverized fuel when fired. The magnesite-coal blend is then pulverized and fired.

Several hours after the so-treated coal was first introduced into the combustion zone, stack testing, with the SCR not in operation, showed that the $SO_3$ level had been reduced to about 15 ppm, for a 50% reduction in $SO_3$ level as a result of the magnesite addition to the coal.

A second test was run using magnesite pre-ground to a −200 mesh powder. That powder was added to the coal bunker feed belt at a rate to provide 0.83% magnesite on the as-fired coal. Stack testing again showed a 50% reduction in the $SO_3$ concentration as a result of the addition of the magnesite powder.

Furthermore, based upon experience with the use of limestone as a combustion zone additive, it is believed that the addition of the pulverized magnesite to the coal would result in a mercury reduction of the order of at least about 80%.

EXAMPLE 3

A 600 MW power plant boiler was operating by burning 2.75% sulfur coal. The coal was treated with powdered magnesite that was of a size to pass through a −200 mesh screen. The magnesite was deposited on the coal as the coal was conveyed on the coal belt. The powdered magnesite was deposited on the surface of the coal on the belt at a rate of 2 pounds of powdered magnesite per ton of coal. After several hours conditioning time to assure a steady-state condition, the gas in the exit gas ducting was judged to involve an $SO_3$ reduction over baseline $SO_3$ concentration of the order of about 40%.

EXAMPLE 4

A 550 MW power plant boiler that includes a downstream SCR and a wet lime scrubber burns about 250 tons of coal per hour. The coal is a Midwestern bituminous coal and has an average sulfur content of about 2.7%, which results in about 27 to about 30 ppm $SO_3$ in the stack with the SCR not in operation. When the SCR is operating, the $SO_3$ level in the stack increases to about 50 ppm.

Crushed magnesite ore having a size of −¾ inch is added to the coal bunker feed belt before pulverization and at a rate to provide about 0.8% magnesite in the coal-magnesite fuel when fired. The magnesite is then pulverized with the coal and the pulverized coal-magnesite fuel is introduced into the boiler and fired.

Several hours after the so-treated coal is first introduced into the combustion zone, a time sufficient to allow steady-state conditions to develop in the flue discharge, it is believed that stack testing would reveal that the addition of the pulverized magnesite to the coal would result in a mercury reduction in the flue discharge of the order of at least about 80%. It is also believed that presence in the flue discharge of other toxic metals, such as arsenic, lead, cadmium, and selenium, would be similarly reduced by the addition of the magnesite to the coal.

The foregoing discussion is based upon the use of raw magnesite ore. However, in addition to raw magnesite ore as the additive material, raw brucite ore, which contains $Mg(OH)_2$, is also believed to be effective in reducing the $SO_3$ and the $H_2SO_4$ that are produced as coal combustion products. In that regard, $Mg(OH)_2$ calcines at a lower temperature and would tend to have a lower surface area if fed at the same position of the combustion zone as the magnesite. It would probably be most effective if injected into the somewhat cooler upper portion of the boiler.

The effectiveness of the magnesite addition as an $SO_3$ sorbent and as a toxic metal sorbent was surprising. Because of the dynamics of coal handling, sizing, burning, and heat transfer within the boiler, the results provided by the present invention could not be predicted or anticipated. Laboratory and field testing showed the disclosed process to be practical and effective. And in addition to its effect on $SO_3$ capture, the resulting surface chemistry of the particles also serves to adsorb toxic metals trapped within the coal. The disclosed process therefore also provides a more economical process for the capture and control of toxic metals, thereby lowering the quantity of environmentally undesirable stack discharge components.

Although particular embodiments of the present invention have been illustrated and described, it will be apparent to those skilled in the art that changes and modifications can be made without departing from the spirit of the present invention. As only one illustration of such possible changes, although discussed above in the context of coal as the fuel, the invention is believed also to be applicable to other solid fuels that can be milled, that can contain toxic metals, and that can cause fouling of boiler internal components. Examples of such other possible solid fuels are coke, peat, trash, wood, biomass, and manure. Accordingly, it is intended to encompass within the appended claims all such changes and modifications that fall with the scope of the present invention.

What is claimed is:

1. A process for reducing visible sulfur emissions attributable to sulfuric acid mist during coal combustion, said process comprising the steps of:
    mixing together a raw, unprocessed magnesium carbonate ore and coal to form a coal-ore mixture that results in a ratio of elemental magnesium to sulfur trioxide in flue gas of at least 1:1;
    pulverizing the coal-ore mixture prior to combustion to provide coal-ore mixture particles that do not exceed −200 mesh; and
    combusting the coal-ore mixture particles at a temperature sufficient to cause ore particles to calcine and decrepitate to magnesium oxide particles having a particle specific surface area of from about 200 $m^2/g$ to about 5 $m^2/g$ to absorb toxic metals and react with sulfur trioxides formed during combustion.

2. A process as claimed in claim 1 wherein the magnesium carbonate ore is pre-pulverized prior to mixing with the coal.

3. A process as claimed in claim 1 wherein the elemental magnesium in the ore to sulfur trioxide in the flue gas is from about 1:1 to about 10:1.

4. A process as claimed in claim 1 wherein the ore is intimately mixed with the coal and reacts with ash components to yield ash deposits that are friable and readily removed from furnace convective pass tubes.

5. A process as claimed in claim 1 wherein the toxic metals are selected from the group consisting of mercury, arsenic, lead, cadmium, and selenium.

6. A process as claimed in claim 1 wherein the magnesium carbonate ore is magnesite.

7. A process as claimed in claim 1 wherein the magnesium carbonate ore is brucite.

* * * * *